US009459350B2

(12) United States Patent
Betts et al.

(10) Patent No.: US 9,459,350 B2
(45) Date of Patent: Oct. 4, 2016

(54) SECTOR-SCANNING DEVICE

(71) Applicants: David A. Betts, Eufaula, AL (US);
Sean M. DeHart, Eufaula, AL (US)

(72) Inventors: David A. Betts, Eufaula, AL (US);
Sean M. DeHart, Eufaula, AL (US)

(73) Assignee: Johnson Outdoors Inc., Racine, WI (US)

( * ) Notice: Subject to any disclaimer, the term of this patent is extended or adjusted under 35 U.S.C. 154(b) by 162 days.

(21) Appl. No.: 14/213,106

(22) Filed: Mar. 14, 2014

(65) Prior Publication Data

US 2014/0269164 A1    Sep. 18, 2014

Related U.S. Application Data

(60) Provisional application No. 61/794,502, filed on Mar. 15, 2013.

(51) Int. Cl.
*G01S 15/89* (2006.01)
*G01S 7/56* (2006.01)
*G01S 15/96* (2006.01)
*G01S 7/521* (2006.01)
*G01S 7/62* (2006.01)
*G01S 15/42* (2006.01)
*G01S 15/87* (2006.01)

(Continued)

(52) U.S. Cl.
CPC .............. *G01S 15/89* (2013.01); *G01S 7/521* (2013.01); *G01S 7/6236* (2013.01); *G01S 15/42* (2013.01); *G01S 15/87* (2013.01); *G01S 15/96* (2013.01); *G01S 7/003* (2013.01); *G01S 15/025* (2013.01)

(58) Field of Classification Search
CPC ...... G01S 15/89; G01S 15/87; G01S 7/6236; G01S 15/025; G01S 15/96; G01S 7/521; G01S 15/42; G01S 7/003
See application file for complete search history.

(56) References Cited

U.S. PATENT DOCUMENTS 3,553,638 A * 1/1971 Sublett ................. G10K 11/355
                                                    367/104
3,752,255 A * 8/1973 Hill ........................ A61B 8/00
                                                    367/104

(Continued)

FOREIGN PATENT DOCUMENTS

EP           1 353 404 A2    10/2003

OTHER PUBLICATIONS

Imagenex Model 881A—Digital Multi-Frequency Imaging Sonar; Aug. 2002—Revised Jan. 2011; 3 pages (pp. 1-3).

(Continued)

*Primary Examiner* — Daniel Pihulic
(74) *Attorney, Agent, or Firm* — Reinhart Boerner Van Deuren P.C.

(57) ABSTRACT

A sector-scanning sonar imaging system with at least one sonar imaging element housed within a transducer housing coupled to a self-reciprocating mechanism, and a drive mechanism housed within a waterproof housing. The oscillating motion of the transducer housing produces a highly-detailed, photo like sector scan sonar image of the bottom and other objects surrounding the boat on which it is mounted. The drive mechanism housing may be rigidly attached to either a boat hull or to a trolling motor. The sonar imaging element housing may be removably attached to the drive mechanism, and shielded by an acoustically transparent shroud to protect the elements from damage. The sector-scanning sonar imaging system connects to a control head with display either directly, or through some other communications protocol, such as a wireless protocol.

29 Claims, 6 Drawing Sheets

(51) Int. Cl.
*G01S 15/02* (2006.01)
*G01S 7/00* (2006.01)

(56) References Cited

U.S. PATENT DOCUMENTS

| | | | | |
|---|---|---|---|---|
| 3,781,775 | A | * | 12/1973 | Malloy ............... G01S 15/8902 367/104 |
| 3,974,826 | A | * | 8/1976 | Eggleton ................. A61B 8/00 315/378 |
| 4,215,585 | A | * | 8/1980 | Kunii ................... A61B 8/4281 367/104 |
| 4,238,962 | A | | 12/1980 | Taenzer |
| 4,298,964 | A | * | 11/1981 | Warnshuis, Jr. ...... G10K 11/008 367/153 |
| 4,418,698 | A | | 12/1983 | Dory |
| 4,479,206 | A | * | 10/1984 | Granberg ................ G01S 15/42 367/104 |
| 4,905,208 | A | | 2/1990 | Dick |
| 4,982,924 | A | | 1/1991 | Havins |
| 5,109,364 | A | * | 4/1992 | Stiner .................. G10K 11/006 367/165 |
| 5,546,362 | A | | 8/1996 | Baumann et al. |
| 5,675,552 | A | | 10/1997 | Hicks et al. |
| 6,245,441 | B1 | | 6/2001 | Yokoyama et al. |
| 7,212,466 | B2 | | 5/2007 | Wilson |
| 7,450,470 | B2 | | 11/2008 | Wilson |
| 7,633,835 | B1 | | 12/2009 | Erikson et al. |
| 7,652,952 | B2 | | 1/2010 | Betts et al. |
| 7,710,825 | B2 | | 5/2010 | Betts et al. |
| 7,729,203 | B2 | | 6/2010 | Betts et al. |
| 7,755,974 | B2 | | 7/2010 | Betts et al. |
| 2006/0023570 | A1 | | 2/2006 | Betts et al. |
| 2009/0182237 | A1 | * | 7/2009 | Angelsen ................ B06B 1/064 600/459 |
| 2010/0256813 | A1 | | 10/2010 | Chiappetta et al. |
| 2012/0014220 | A1 | * | 1/2012 | DePasqua ........... G01S 7/52004 367/88 |
| 2013/0215719 | A1 | * | 8/2013 | Betts ....................... G01S 7/521 367/88 |
| 2014/0269164 | A1 | * | 9/2014 | Betts ....................... G01S 15/89 367/7 |

OTHER PUBLICATIONS

Sonavision World Class Underwater Technology, Mercury Scanning Sonar—Clarity Without Compromise; known prior to Feb. 22, 2012; 2 pages.
Tritech International SeaKing Hammerhead DST Sonar; known prior to Feb. 22, 2012; 2 pages.
Tritech International Micron DST Sonar—Ultra Compact CHIRP Digital Sonar; known prior to Feb. 22, 2012; 2 pages.
Tritech International Super SeaKing DST—New Generation Digital CHIRP Sonar; known prior to Feb. 22, 2012; 2 pages.
Tritech International Super SeaPrince DST; known prior to Feb. 22, 2012; 2 pages.
JW Fishers Scanning Sonar; date last visited Feb. 7, 2012; 2 pages printed from internet http://www.jwfishers.com/scan650.htm.
Sonavision Products—SV 2020 Sonar; known prior to Feb. 22, 2012; 2 pages.
Sonavision Products—SV1010 Sonar; known prior to Feb. 22, 2012; 2 pages.
Kongsberg—6000 m Sonar Head Digital Telemetry; known prior to Feb. 22, 2012; 2 pages.
Kongsberg—1500 m Sonar Head Digital Telemetry; known prior to Feb. 22, 2012; 2 pages.
Kongsberg—650 m Sonar Head Digital Telemetry; known prior to Feb. 22, 2012; 2 pages.

* cited by examiner

SECTOR-SCANNING DEVICE

CROSS-REFERENCE TO RELATED PATENT APPLICATIONS

This patent application claims the benefit of U.S. Provisional Patent Application No. 61/794,502, filed Mar. 15, 2013, the entire teachings and disclosure of which are incorporated herein by reference thereto.

FIELD OF THE INVENTION

The present invention relates generally to sonar imaging systems for use in sport fishing applications such as in a fish finder, sonar depth sounder, etc., and more particularly to a sector-scanning sonar imaging systems for imaging of the underwater environment all around the watercraft rather than just below or to the sides of the watercraft.

BACKGROUND OF THE INVENTION

Sonar devices that transmit sound waves have been used previously to obtain information about underwater articles, including fish, structures and obstructions, and the bottom. The sound waves travel from a transducer mounted to a bottom surface of the vessel through the water. The sound wave transmits from the sonar devices in diverging patterns. The sound waves contact underwater articles, which create return echoes. The transducer receives the return echoes and the sonar device analyzes the received echoes. A display device displays representations of the received echoes, for locating fish and other underwater articles.

Embodiments of the present invention represent an advancement over the current state of the art with respect to sonar imaging systems. Certain advantages of the invention, as well as various inventive features, will be apparent from the description of the invention provided herein.

Conventional "search light" rotating sonar systems use a conical beam configuration to find schools of fish in the water column. Such systems tend to provide a large "footprint" of the bottom of a given body of water. This large footprint results in sonar images that lack detail and may be difficult to read, especially for inexperienced users.

BRIEF SUMMARY OF THE INVENTION

In one aspect, embodiments of the invention provide a sonar imaging system that includes a sonar imaging element housed within a housing, and a self-reciprocating mechanism configured to produce oscillating movement of the housing and the first sonar imaging element therein. In a specific embodiment of the invention, the sonar imaging element is long in the horizontal dimension (e.g., 3-7 inches) to provide a narrow beam in the side-to-side orientation and is very narrow (e.g., less than 0.5 inches) in the vertical dimension to provide a very wide beam in the vertical, or top-to-bottom, orientation. The oscillating movement allows the first sonar imaging element to produce a highly detailed photo-like sonar image where logs look like logs, trees looks like trees, fish look like fish, and rocks look like rocks, all without requiring movement of the boat.

In a particular embodiment, the transducer housing is pivotably attached at a pivot point to a support member, and the self-reciprocating mechanism has a linear actuator attached to the support member. The linear actuator has an actuating member attached to the housing. The oscillatory movement of the actuating member causes the oscillatory movement of the transducer housing about the pivot point. The linear actuator may be powered electrically, hydraulically, or pneumatically.

In a particular embodiment, the housing is rigidly attached to the shaft of a stepper motor. The stepper motor rotates back and forth sweeping the sonar imaging element through an angle. The stepper motor is connected to an external stepper motor controller which controls the sweep speed and angle that the sonar imaging elements travel through, as well as syncing the motor movement to the sonar so that the transducer housing is not moving while the sonar is transmitting and receiving. In a particular embodiment, the sweep angle of the stepper motor may be set or adjusted, by the user for example. In a more particular embodiment, the sweep angle of the stepper motor may be set or adjusted by the user in real time.

In a particular embodiment, the housing is rigidly attached to the shaft of a motor equipped with a rotary encoder. The encoder relays information about position and speed of the housing movement and sonar imaging elements allowing an external controller to determine the sweep speed and angle that the sonar imaging elements travel through. In an additional embodiment, the transducer housing is attached to the shaft of a motor through a slip clutch mechanism.

In a particular embodiment, the housing has a slot and is pivotably anchored in place at a pivot point. In embodiments, the self-reciprocating mechanism has a wheel adjacent to the slot in the housing. The wheel has a post attached to a face thereof, the post being held within the slot. Turning of the wheel causes the post to move within the slot which produces an oscillatory movement of the housing about the pivot point. The wheel may be driven electrically, hydraulically, or pneumatically. In an additional embodiment, the wheel is coupled to the drive mechanism through a slip clutch mechanism.

Embodiments of the sonar imaging system include a second imaging element located adjacent the first sonar imaging element. The oscillatory movement of the housing about a pivot point produces two sector scan sonar images, some with respective centers spaced from five degrees to 90 degrees apart.

In another aspect, embodiments of the invention provide a sonar imaging system configured to attach to a propeller pod of a trolling motor. Directly attaching to the propeller pod of a trolling motor allows for the user to easily deploy and retract the sonar imaging system in a manner they are already familiar with. The sonar imaging system is also oriented along the axis of the trolling motor propeller pod, allowing the user to aim the self-reciprocating sonar imaging device using the same foot pedal or electric control used to steer the trolling motor without requiring motion of the trolling motor itself to generate the images.

In a particular embodiment, the transducer housing and self-reciprocating mechanism are attached to a track system that allows the sonar imaging system to move from beyond an end of the motor pod to a position towards the center of the motor pod. The track system may be spring loaded.

In certain embodiments, the self-reciprocating mechanism is configured to periodically stop movement of the transducer housing while the first sonar imaging element transmits and receives. A sweep angle of the transducer housing between periodic stops may be variable. In a further embodiment, the first sonar imaging element and the transducer housing are removably attached to the self-reciprocating mechanism. The first sonar imaging element and the transducer housing are protected, in some embodiments, by a rigid shroud that surrounds the first sonar imaging element and the transducer housing. The rigid shroud may be made of an acoustically transparent material. Embodiments of the first sonar imaging element produce a fan-shaped beam that is wider in a vertical orientation than in a horizontal orientation. In more particular embodiments, the fan-shaped beam is greater than 40 degrees in the vertical orientation, and less than five degrees in the horizontal orientation.

Embodiments of the sonar imaging system include an onboard compass to detect orientation of the sonar imaging system. The sonar imaging system may be connected to a control head display which displays a current GPS location. In particular embodiments, the control head is able to mark a waypoint on a sector-scanning sonar image and relate the waypoint to a GPS location using GPS data and the orientation of the sonar imaging system.

Other aspects, objectives and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention and, together with the description, serve to explain the principles of the invention. In the drawings.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

In this application, several embodiments of a sector-scanning sonar imaging system will be discussed. It should be noted, however, that while a number of embodiments will be illustrated and/or discussed hereinbelow, such embodiments should be taken by way of example and not by way of limitation. In these exemplary embodiments, the sector-scanning sonar imaging system may connect directly to a control head with display via the transducer connection and a control communications port, although other embodiments may communicate using other technology, e.g. Ethernet, Wi-Fi, Bluetooth, etc.

The sector scan sonar imaging system may be assembled in such a way to allow the removal of the sonar imaging transducer housing by the user. This allows the user to replace the transducer housing with one of a different design, allowing for different beam shapes, frequency optimization, or to replace a damaged transducer with a new one. In particular embodiments, when the sector-scanning sonar imaging system is connected to a control head, several menus and views are added to the existing user interface.

Figure 7:
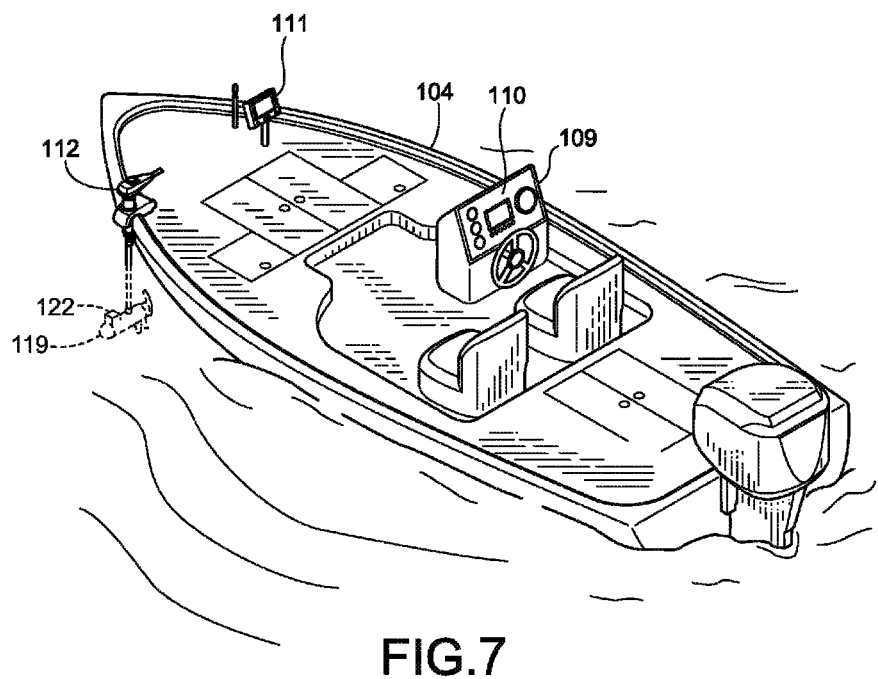
FIG. 7 is a perspective view of a boat that includes a sector-scanning sonar imaging system, in accordance with an embodiment of the invention.

FIG. 7 provides an illustration of the boat 104 having a console 109 with control head 110 that includes a sonar display at the control head and a second display 111 at the bow of the boat 104. In the embodiment shown, the boat 104 has a bow-mounted trolling motor 112 with a propeller pod 119 suspended from shaft 116. However, it is conceivable that this embodiment of the invention could be employed in a transom-mounted trolling motor. In the embodiment of FIG. 7, a transducer assembly 122 is attached to the propeller pod 119.

Figure 8:
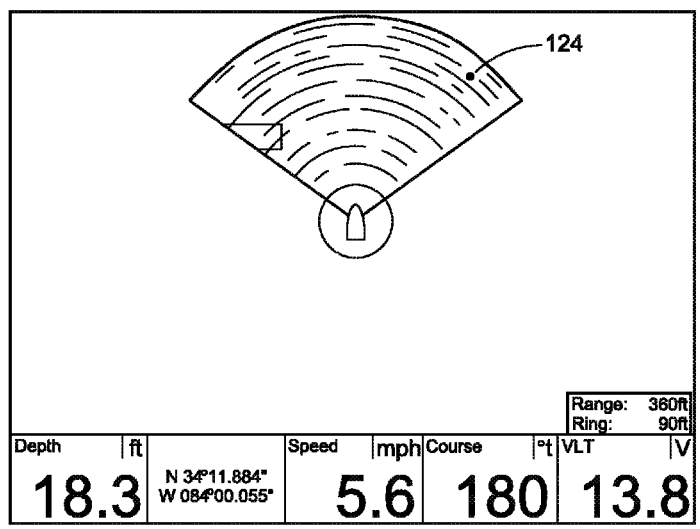
FIG. 8 is a screen shot illustration of an exemplary sector-scanning sonar image with waypoint, according to an embodiment of the invention.

In particular embodiments, the boat 104 or the sonar imaging system has an onboard compass and the control head 110 is GPS-enabled. As shown in FIG. 8, using orientation data from the onboard compass in conjunction with the GPS data from the control head 110, the user is able to mark one or more waypoints 124 on the sector scan sonar image. The waypoint 124 may be recorded at the boat's current location or the user may choose some point on the displayed sonar image to record the waypoint 124. The waypoint 124 may be stored in the control head 110 memory until recalled by the user.

Embodiments of the present invention provide a new and improved sonar imaging system, employing a mechanically-sweeping, or mechanically-scanning, sonar that is capable of being connected to a surface watercraft, such as a fishing boat. In a particular embodiment, the boat does not need to be moving in order to generate the high-quality photo-like sonar imagery. It is a further objective to provide a new and improved sonar imaging system that provides photograph-like imaging of the underwater environment for sectors around and below the watercraft. A sonar imaging system that provides such photograph-like imaging is described in U.S. patent application Ser. No. 13/774,143, filed on Feb. 22, 2013, the entire contents and disclosure of which is incorporated herein by reference thereto.

Figure 1:
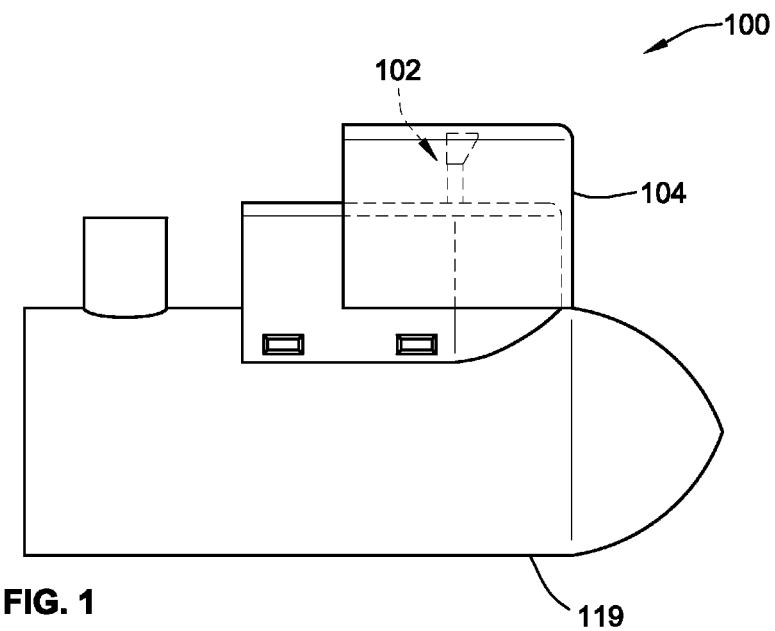
FIG. 1 is a side view of a sector-scanning sonar imaging system, constructed in accordance with an embodiment of the invention.

FIG. 1 is a side view of a sector-scanning sonar imaging system 100, constructed in accordance with an embodiment of the invention. In particular embodiments of the invention, one or more sonar imaging elements 102 are potted inside of a sonar transducer assembly, which is protected by an acoustically transparent shroud 104 that is rigidly attached to the drive housing. Other embodiments may include additional protection measures. In a particular embodiment, the sonar imaging system 100 is attached to the propeller pod 119 of a trolling motor via pivoting legs, or a track system, which allows the sonar imaging system 100 to move back and out of the way in the event of a collision, or to absorb the impact of the collision without sustaining significant damage. The acoustically transparent shroud 104 may be used to protect any of the embodiments described hereinbelow.

Figure 2:
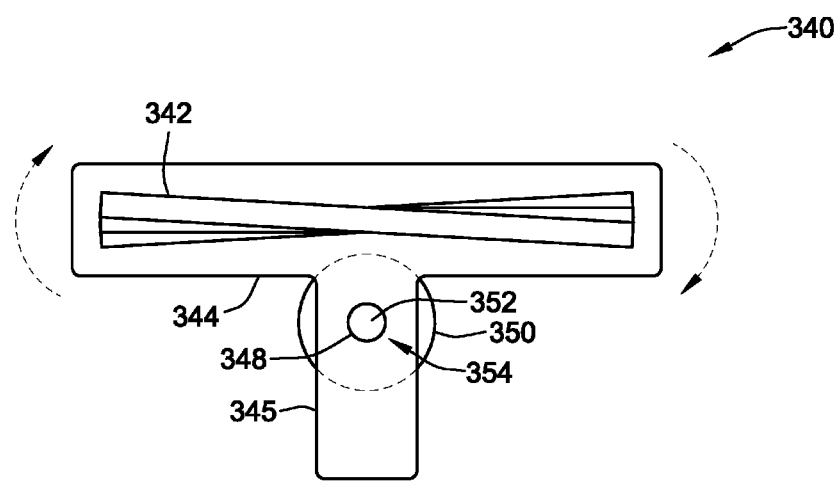
FIG. 2 is a schematic diagram of an alternate sector-scanning sonar transducer assembly that includes a stepper motor, constructed in accordance with an embodiment of the invention.

FIG. 2 illustrates an exemplary embodiment of a sector-scanning sonar transducer assembly 340 designed to produce a sector scan sonar image, in accordance with an embodiment of the invention. The sonar transducer assembly 340 includes a sonar imaging element 342. In particular embodiments, the sonar transducer assembly 340 includes two or more sonar imaging elements 342 configured to provide two or more complementary sector scan sonar images whose respective centers are spaced from five degrees to 90 degrees apart.

In a particular embodiment of the invention, one or more sonar elements 342 form sonar beams that are wide in the vertical direction for a good area of coverage and very narrow in the horizontal direction for good image definition. A narrow beam may be thought of as one less than about five degrees, while a wide beam may be thought of as one greater than about 40 degrees, the respective beam widths measured at the 3 dB points. This beam configuration aids in producing high-resolution, high quality, photo-like images on the display used for the sector scan sonar imaging system. Alternate embodiments of the invention described below may also use this same beam configuration to produce high-resolution, high quality, photo-like images In particular embodiments, the one or more sonar imaging elements 342 are housed within a housing 344 having an integral support member 345. The housing 344 is pivotably anchored in place at a pivot point 348. The support member 345 is positioned adjacent a stepper motor 350 which has a shaft or post 352 designed to fit in an opening 354 in the support member 345. The stepper motor 350 may be controlled electronically to act as a self-reciprocating mechanism, which reciprocates, or oscillates to create a sector-scanned sonar image. In the context of this application, "self-reciprocating" means that, once activated, the self-reciprocating mechanism oscillates continuously through a particular sweep angle without intervention by the user. In the embodiment of FIG. 2, the stepper motor 350 rotate includes a shaft that attaches the housing 344, where the shaft rotates the housing back and forth through a variable, user-defined sweep angle. In particular embodiments, the user-defined sweep angle is adjustable in real-time allowing the user to set the angle of the sector scan to be displayed. Power and or control signals may be delivered to the stepper motor 350 via some type of shielded cable.

Figure 6:
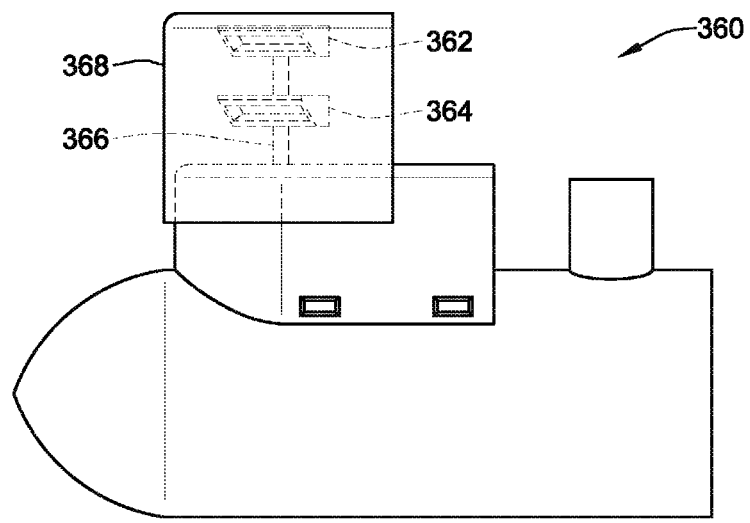
FIG. 6 is a side view of a sonar transducer assembly with multiple sonar imaging elements, according to an embodiment of the invention.

In particular embodiments, the multiple sonar imaging elements are spaced along the axis of rotation to prevent shading of one sonar imaging element by one or more other sonar imaging elements when the elements are depressed from the horizontal plane by some degrees. Such a configuration is shown in FIG. 6, which illustrates a sonar transducer assembly 360 having a first sonar imaging element 362 and a second sonar imaging element 364 mounted on a single shaft 366 such that the first and second sonar imaging elements 362, 364 have the same axis or rotation. The first and second sonar imaging elements 362, 364 are surrounded by a water-flooded protective acoustically-transparent shroud 368.

As with the sonar transducer assemblies 300, 320 shown above, the sonar transducer assembly 340 may be housed in a pod attached directly to the hull of the boat or to a fairing block attached to the hull of the boat. The pod may or may not be oil-filled. Alternately, the sonar transducer assembly 340 may be housed in a pod attached to the propeller pod 119 (see FIG. 5) of trolling motor 112, or at the bottom end of a transom-mounted shaft, for example.

Figure 5:
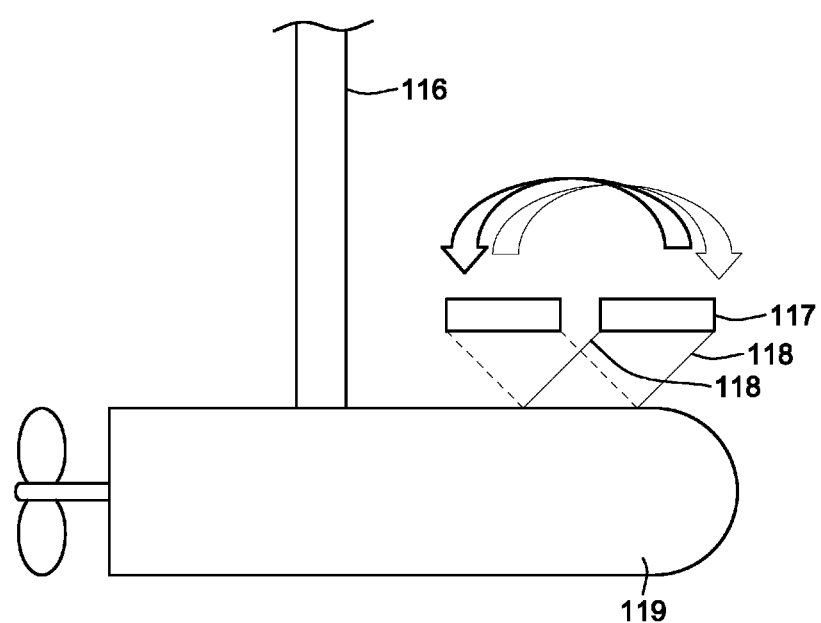
FIG. 5 is a schematic diagram of a trolling motor scanning mount, constructed in accordance with an embodiment of the invention.

A system and method of deploying a sector-scanning sonar imaging system using a trolling motor scanning mount, is shown in FIG. 5, in accordance with an embodiment of the invention. As can be seen from FIG. 5, a sonar imaging system 117 is attached to a top portion of the trolling motor 112 suspended from shaft 116, although other embodiments may attach to the side or bottom of the motor. In the embodiment of FIG. 5, the sonar imaging system 117 is attached to a pair of pivoting legs 118 that allow the sonar imaging system 117 to move from beyond an end of the propeller pod 119 to a position towards the center of the propeller pod 119. The sonar transducer assembly 300 may be housed in a pod attached directly to the hull of the boat or to a fairing block attached to the hull of the boat. The pod may or may not be oil-filled. Alternately, the sonar transducer assembly 300 may be housed in a pod attached to the propeller pod 119 of trolling motor 112, or at the bottom end of a transom-mounted shaft, for example.

Figure 4:
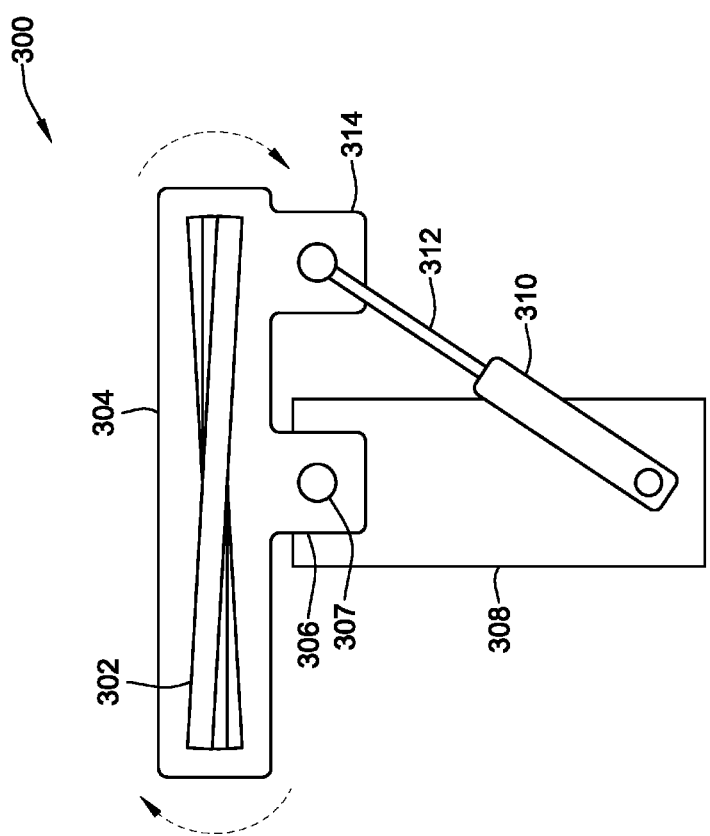
FIG. 4 is a schematic diagram of a sector-scanning sonar transducer assembly using a linear actuator, constructed in accordance with an embodiment of the invention.

In certain embodiments of the invention, a sector-scanning sonar transducer assembly may be employed to produce a sector scan sonar image. FIG. 4 shows a schematic diagram of a sector-scanning sonar transducer assembly 300 that includes at least one sonar imaging element 302. In particular embodiments, the sonar transducer assembly 300 includes two sonar imaging elements 302 configured to provide two complementary sector scan sonar images whose respective centers are spaced between five and 90 degrees apart. In certain embodiments, the sonar imaging elements are spaced along the axis of rotation to prevent shading of one element by the others. In the embodiment shown, the sonar imaging element 302 is housed within a housing 304, which has a central attachment 306. A support member 308 is pivotably attached to the housing 304 at the central attachment 306, creating a pivoting connection 307, or pivot point 307, at the point of attachment. A linear actuator 310 is attached to the support member 308. The linear actuator 310 may be powered by numerous means, i.e., electrically, hydraulically, pneumatically, etc. The power may be delivered to the linear actuator 310 via some type of shielded cable, which may or may not be routed through the support member 308. An actuating member 312 of the linear actuator 310 is attached to an outer attachment 314 of the housing 304.

The sonar transducer assembly 300 is designed to provide a sector scan image when the actuating member 312 moves back and forth, causing the housing 304 and sonar imaging element 302 to oscillate back and forth about the pivoting connection 307 between the central attachment 306 and the support member 308. The oscillatory back and forth movement of the sonar imaging element 302 results in a sector scan sonar image whose angle is determined by the range of motion of the sonar imaging element 302. Thus, if a larger sector scan is desired, the actuating member 312 can be set to extend and retract a greater distance, such that the housing 304 oscillates further in each direction.

Figure 3:
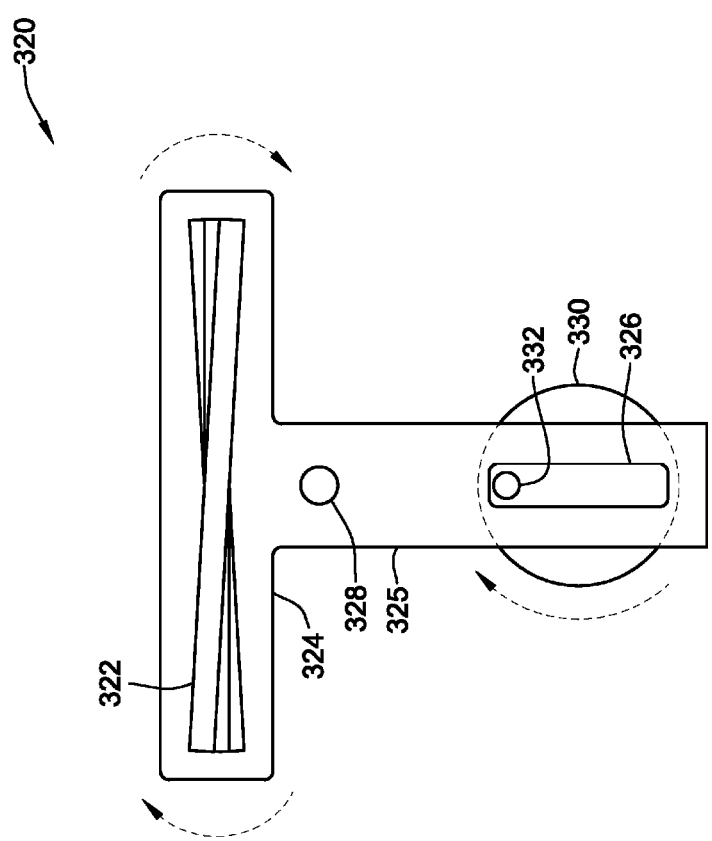
FIG. 3 is a schematic diagram of an alternate sector-scanning sonar transducer assembly with a rotating wheel, constructed in accordance with an embodiment of the invention.

FIG. 3 illustrates yet another sector-scanning sonar transducer assembly 320 designed to produce a sector scan sonar image, in accordance with an embodiment of the invention. The sonar transducer assembly 320 includes a sonar imaging element 322. In particular embodiments, the sonar transducer assembly 320 includes two or more sonar imaging elements 322 configured to provide two or more complementary sector scan sonar images whose respective centers are spaced from five degrees to 90 degrees apart. In particular embodiments, the multiple sonar imaging elements 322 are spaced along the axis of rotation to prevent shading of one sonar imaging element 322 by the others.

The sonar imaging element 322 is housed within a housing 324 having an integral support member 325 with a slot 326 therein. The housing 324 is pivotably anchored in place at a pivot point 328. The support member 325 is positioned adjacent a wheel 330 which has a post 332 designed to fit in slot 326, and attached near a perimeter of the wheel 330. The wheel 330 may be driven by numerous means, i.e., electrically, hydraulically, pneumatically, etc. The power may be delivered to the wheel 330 via some type of shielded cable, which may or may not be routed through the housing 324.

As the wheel 330 turns, the post 332 in slot 326 causes the housing 324 and the sonar imaging element 322 therein, to oscillate back and forth. This oscillatory movement allows the sonar imaging element 322 to produce a sector-scanned sonar image whose boundaries are determined, at least partly, by the diameter of the wheel 330 and the distance between the wheel 330 and the pivot point 328.

In contrast to conventional "search light" rotating sonar systems that use a circular beam configuration to find schools of fish in the water column, a true imaging sonar system, such as described herein, uses a "fan" shaped beam that is wide (e.g., >40 degrees) in the top-to-bottom orientation and very narrow (e.g., <5 degrees) in the side-to-side orientation. This beam orientation, along with a downward tilt (e.g., −10 to −40 degrees from the horizontal), provides a very narrow and short insonified "footprint" of the bottom at any given time in the transmitted wave front propagation path. This small "footprint" along with the proper signal processing provides for photograph-like images of an area of the bottom.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A sector-scanning sonar imaging system comprising:
   a first sonar imaging element housed within a transducer housing, the transducer housing configured for attachment to some portion of a boat; and
   a self-reciprocating mechanism configured to produce oscillating movement of the transducer housing and the first sonar imaging element therein, wherein the oscillating movement allows the first sonar imaging element to produce a sector scan sonar image for a portion of an area around the boat;
   wherein the self-reciprocating mechanism is configured to periodically stop movement of the transducer housing while the first sonar imaging element transmits and receives.

2. The sector-scanning sonar imaging system of claim 1, wherein the sonar imaging element has a depression angle between 10 and 45 degrees with respect to a vertical plane.

3. The sector-scanning sonar imaging system of claim 1, wherein the transducer housing is pivotably attached at a pivot point to a support member, and wherein the self-reciprocating mechanism comprises a linear actuator is attached to the support member, the linear actuator having an actuating member attached to the transducer housing;
   wherein a reciprocating movement of the actuating member causes the oscillatory movement of the transducer housing about the pivot point.

4. The sector-scanning sonar imaging system of claim 3, wherein the linear actuator is powered either electrically, hydraulically, or pneumatically.

5. The sector-scanning sonar imaging system of claim claim 1, further comprising a second sonar imaging element located adjacent the first sonar imaging element, wherein the oscillatory movement of the transducer housing about a pivot point produces two sector scan sonar images.

6. The sector-scanning sonar imaging system of claim 5, wherein each of the two sector scan sonar images has a respective center, the centers spaced from 5 degrees to 90 degrees apart.

7. The sector-scanning sonar imaging system of claim 5, wherein the first and second sonar imaging elements are separated along the axis of rotation such that each sonar imaging element has an unobstructed path for the sound to travel.

8. The sector-scanning sonar imaging system of claim 1, wherein the transducer housing has a slot therein and is pivotably anchored in place at a pivot point;
   wherein the self-reciprocating mechanism comprises a wheel adjacent to the slot in the transducer housing, the wheel having a post attached to a face thereof, the post being held within the slot; and
   wherein turning of the wheel causes the post to move within the slot which produces an oscillatory movement of the transducer housing about the pivot point.

9. The sector-scanning sonar imaging system of claim 8, wherein the wheel is driven either electrically, hydraulically, or pneumatically.

10. The sector-scanning sonar imaging system of claim 9, wherein the wheel is coupled to the driving mechanism through a slip clutch mechanism.

11. The sector-scanning sonar imaging system of claim 1, wherein the transducer housing and self-reciprocating mechanism are attached to a motor pod of a trolling motor.

12. The sector-scanning sonar imaging system of claim 11, wherein the transducer housing and self-reciprocating mechanism are attached to a pair of pivoting legs that allow the sonar imaging system to move from beyond an end of the motor pod to a position towards the center of the motor pod.

13. The sonar imaging system of claim 11, wherein the transducer housing and self-reciprocating mechanism are attached to a track system that allows the sonar imaging system to move from beyond an end of the motor pod to a position towards the center of the motor pod.

14. The sector-scanning sonar imaging system of claim 13, wherein the track system is spring loaded.

15. The sector-scanning sonar imaging system of claim 1, wherein the housing is rigidly attached to the shaft of a stepper motor that rotates back and forth sweeping the sonar imaging element through an angle.

16. The sector-scanning sonar imaging system of claim 1, wherein a sweep angle of the transducer housing between periodic stops is variable.

17. The sector-scanning sonar imaging system of claim 1, wherein the transducer housing is rigidly attached to a shaft of a motor equipped with a rotary encoder that relays information about position and speed of the housing and first sonar imaging element, such that an external controller can determine the sweep speed and angle of the first sonar imaging element.

18. The sector-scanning sonar imaging system of claim 17, wherein the housing is attached to the shaft of the motor through a slip clutch mechanism.

19. The sector-scanning sonar imaging system of claim 17, wherein the self-reciprocating mechanism is configured such that a sweep angle of the first sonar imaging element can be adjusted.

20. The sector-scanning sonar imaging system of claim 1, wherein the first sonar imaging element and the transducer housing are removably attached to the self-reciprocating mechanism.

21. The sector-scanning sonar imaging system of claim 1, wherein the first sonar imaging element and the transducer housing are protected by a rigid shroud that surrounds the first sonar imaging element and the transducer housing.

22. The sector-scanning sonar imaging system of claim 21, wherein the rigid shroud is made of an acoustically transparent material.

23. The sector-scanning sonar imaging system of claim 1, wherein the sonar imaging system has an onboard compass to detect orientation of the sonar imaging system.

24. The sector-scanning sonar imaging system of claim 23, wherein the sonar imaging system is connected to a control head display which displays a current GPS location.

25. The sector-scanning sonar imaging system of claim 24, wherein the control head is able to mark a waypoint on a sector-scanning sonar image and relate the waypoint to a GPS location using GPS data and the orientation of the sonar imaging system.

26. The sector-scanning sonar imaging system of claim claim 1, wherein the first sonar imaging element produces a fan-shaped beam that is wider in a vertical orientation than in a horizontal orientation.

27. The sector-scanning sonar imaging system of claim 26, wherein the fan-shaped beam is greater than 40 degrees in the vertical orientation, and less than five degrees in the horizontal orientation.

28. The sector-scanning sonar imaging system of claim 1, wherein the self-reciprocating mechanism causes the transducer housing to oscillate through a variable, user-defined sweep angle.

29. The sector-scanning sonar imaging system of claim 28, wherein the user-defined sweep angle can be varied by a user in real-time.

* * * * *